Figure 1:
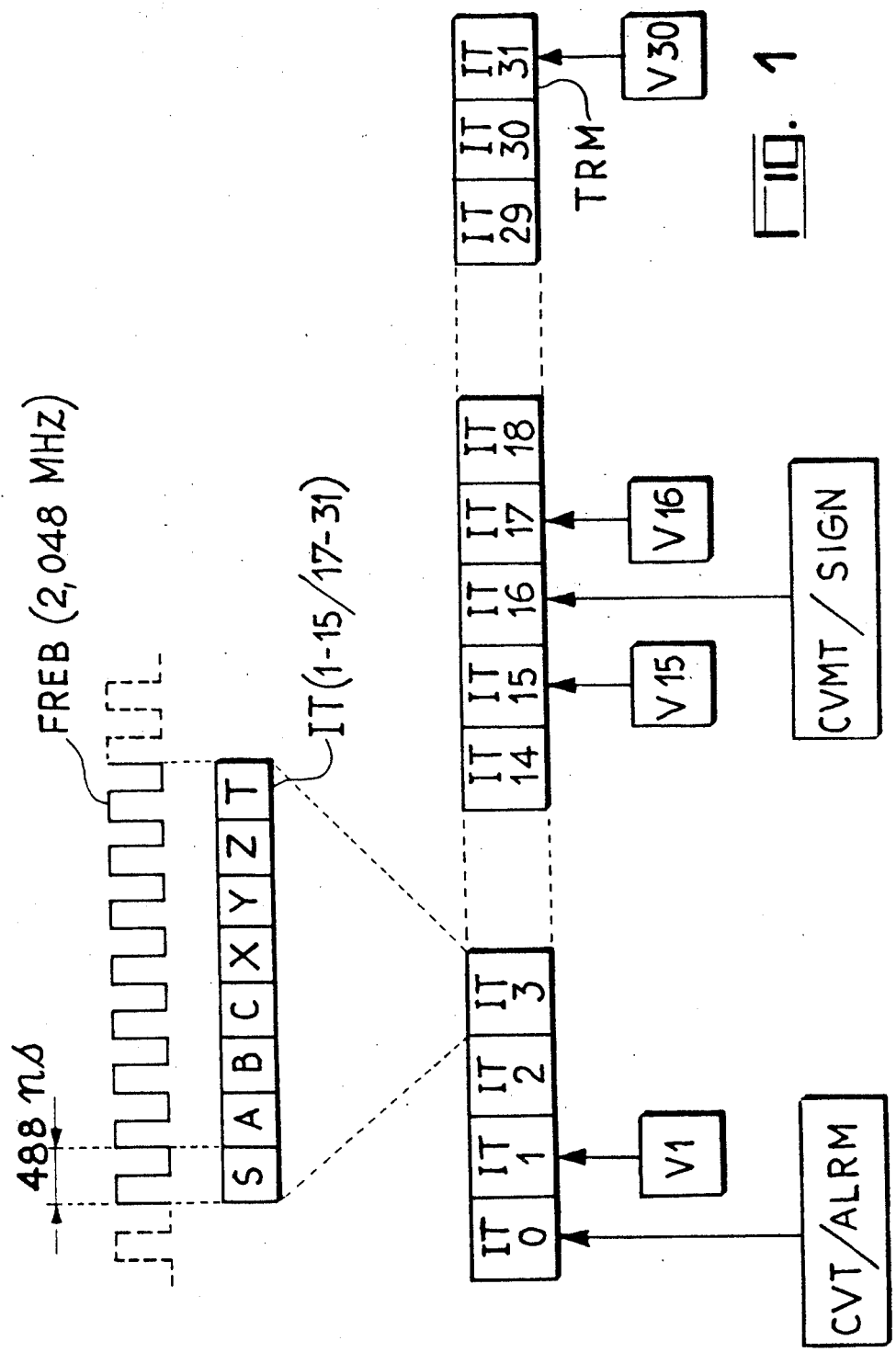

United States Patent [19]

Athénes et al.

[11] 4,095,048

[45] June 13, 1978

[54] METHOD OF SYNCHRONIZING A PULSE CODE MODULATION (PCM) JUNCTION AND AN ARRANGEMENT FOR APPLYING THIS METHOD

[75] Inventors: Claude Athénes; Jean Pierre Landez, both of Paris, France

[73] Assignee: Thomson-CSF, Paris, France

[21] Appl. No.: 696,197

[22] Filed: Jun. 15, 1976

[30] Foreign Application Priority Data

Jun. 17, 1975 France .............................. 75 18960

[51] Int. Cl.² .......................................... H04L 7/00
[52] U.S. Cl. ............................... 178/69.1; 179/15 BS
[58] Field of Search .................... 178/69.1; 179/15 BS

[56] References Cited

U.S. PATENT DOCUMENTS

| | | | |
|---|---|---|---|
| 3,928,726 | 12/1975 | Colton | 178/69.1 |
| 3,928,727 | 12/1975 | Roche | 178/69.1 |
| 3,989,894 | 11/1976 | Charránsól et al | 178/69.1 |
| 3,992,580 | 11/1976 | Bittel et al | 178/69.1 |

*Primary Examiner*—Richard Murray
*Attorney, Agent, or Firm*—Oblon, Fisher, Spivak, McClelland & Maier

[57] ABSTRACT

The invention provides a method of synchronization of a junction in a pulse-code modulation (PCM) transmission network where any two multiplexing-demultiplexing stations equipped with independents clocks have to be brought into synchronism. For this purpose, the pulse trains (T.I.) of the PCM junction are alternatively recorded on two parallel channels A and B (registers RPA and RPB) and then memorized in a frame memory (MTR) by repeating the reading of the register when a risk of error is detected by comparison of the clocks. Means are provided for relocating the T.I. containing the multiframe locking code and the first frame of multiframe.

3 Claims, 6 Drawing Figures

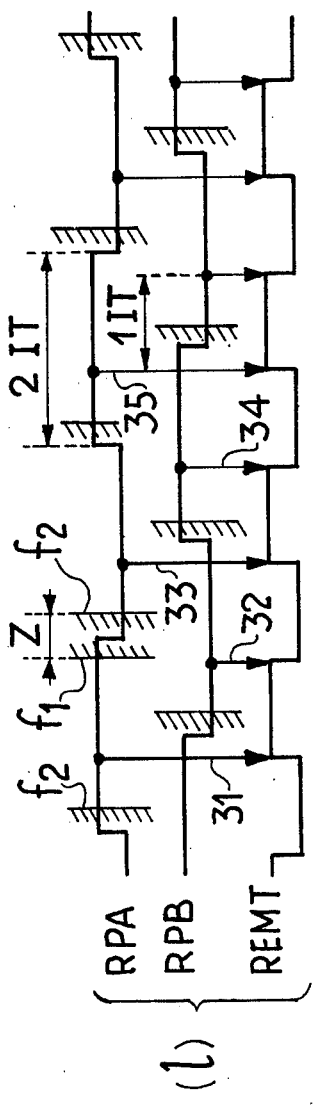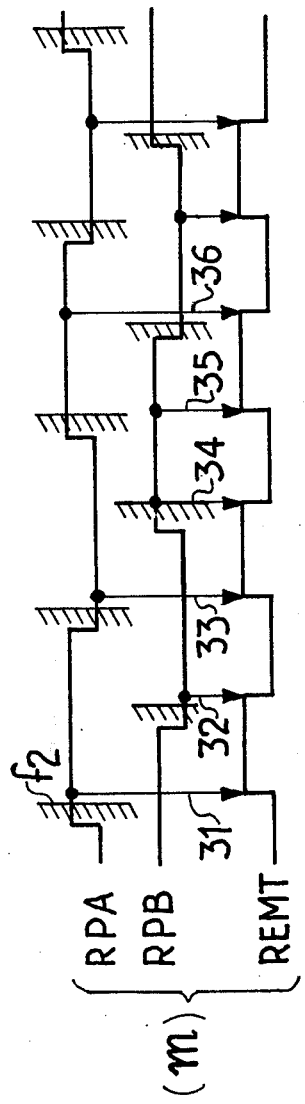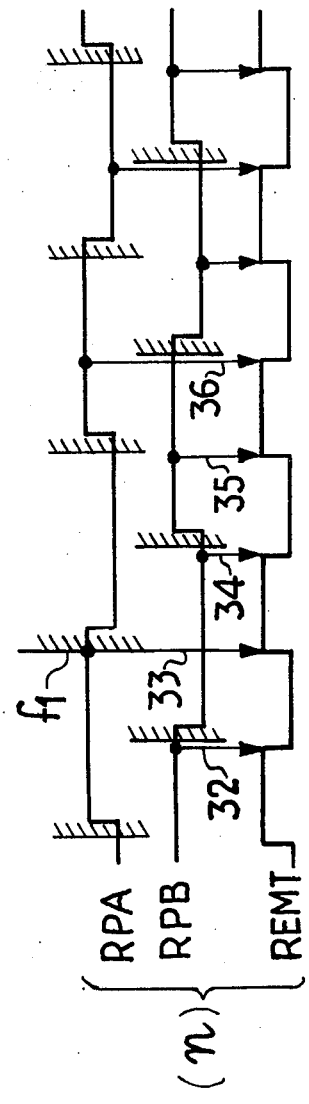
Fig. 4

METHOD OF SYNCHRONIZING A PULSE CODE MODULATION (PCM) JUNCTION AND AN ARRANGEMENT FOR APPLYING THIS METHOD

This invention relates to a method of synchronising a pulse-code modulation (PCM) junction and to an arrangement for applying this method.

It is known that, in the multiplexing technique using pulse-code modulation (PCM), the analogue signals transmitted to the input end of a channel (for example a telephone channel) are converted into pulse trains comprising a constant number (for example 8) of binary digits of the type used in data processing. These pulse trains are contained in time intervals (T.I.) which are inserted as a function of time, forming frames of $n$ T.I. ($n$ being an integer). The frames follow one another at the sampling frequency of the physical quantity to be transmitted. One group of $m$ frames ($m$ = integer of the order of 8 to 32) forms a "multiframe" of which the so-called multiframe or recurrence frequency is a submultiple of the frame frequency. A PCM connection with the following characteristics is taken as an example in the following:

T.I. of 8 bits.
Duration of T.I.: 3.9 microseconds (approximately).
Recurrence frequency of the bits: 2048 kHz.
Number of T.I. of a frame: 32.
Frame frequency: 8 kHz (equal to the sampling frequency).
Multiframe of 16 frames.
Multiframe frequency: 0.5 kHz.

Synchronisation problems arise in the case of a PCM-connection between two points equipped with multiplexing and demultiplexing means. These problems become particularly serious when connections have to be established as required between two signal-processing centres situated at any points, occasionally separated by a considerable distance, of a transmission network.

The principle of the invention comprises three points:

(A) — The synchronising operation takes place on entry into the local processing centre;

(B) — the incoming information is loaded alternately into two registers at the frequency of the remote clock and is then removed alternately from the two registers at the frequency of the local clock;

(C) — complementary facilities enable recording of the incoming information to be shifted by one bit as many times as is necessary in order to synchronise the T.I.'s.

According to the invention, there is provided a method of synchronising a PCM junction of the type established between a remote processing centre, equipped with a so-called remote clock, and a local processing centre equipped with a so-called local clock, comprising the following operations:

(a) detection, by comparing said local and said remote clocks, of the risk of error which is run when a register loaded at the frequency of the remote clock is read at the frequency of the local clock;

(b) successive recording at the frequency of said remote clock of the pulse trains relating to the successive channels of one and the same frame alternately in a register A and in a register B;

(c) determination, by counting the T.I.'s at the frequency of said local clock, of the time of the correction which is necessitated by the detection of an error risk and which can be carried out at a time determined by the moment where the first T.I. of a frame is identified;

(d) carrying out the correction by repeating the reading of one of the two registers A or B at the frequency of said local clock and at said time determined in the course of operation (c);

(e) recording the T.I.'s in a frame memory at predetermined addresses;

(f) detection of a frame locking code and detection of the loss of said code;

(g) shifting of the recording (b) in successive jumps of one bit until said frame locking code is detected again.

The method according to the invention further comprises the following complementary operations carried out in order to relocate the multiframe locking signal:

(h) detection of the multiframe locking signal;
(i) counting the frames;
(j) detection of the first frame of the multiframe;
(k) recording of the T.I. containing the signalling data at the time of the operation (j).

The invention will be better understood and other features thereof will become apparent from the following description and the accompanying drawings, in which:

FIG. 1 shows the basic principles of a conventional PCM connection selected by way of example.

Figure 2:
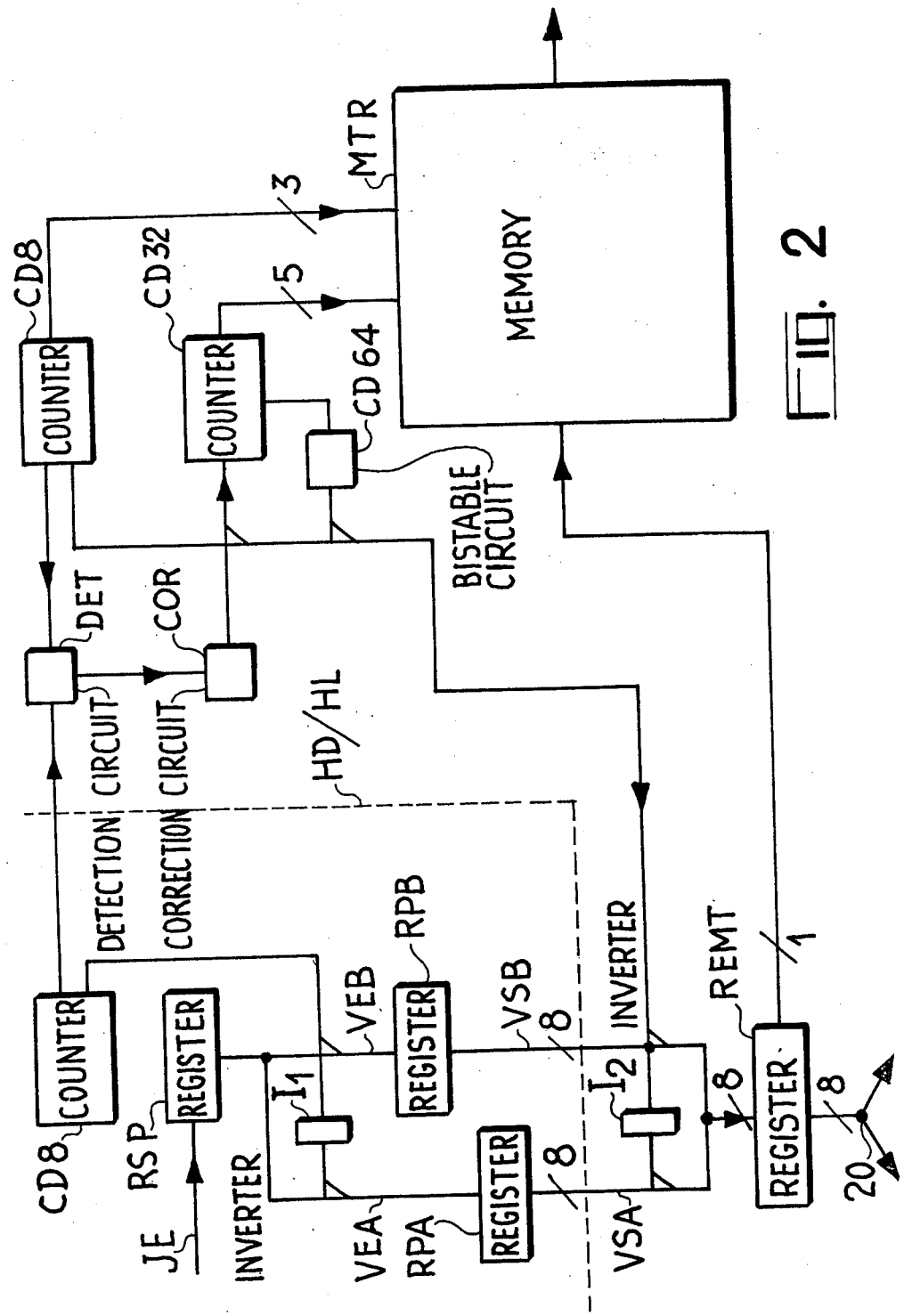
Figure 5:
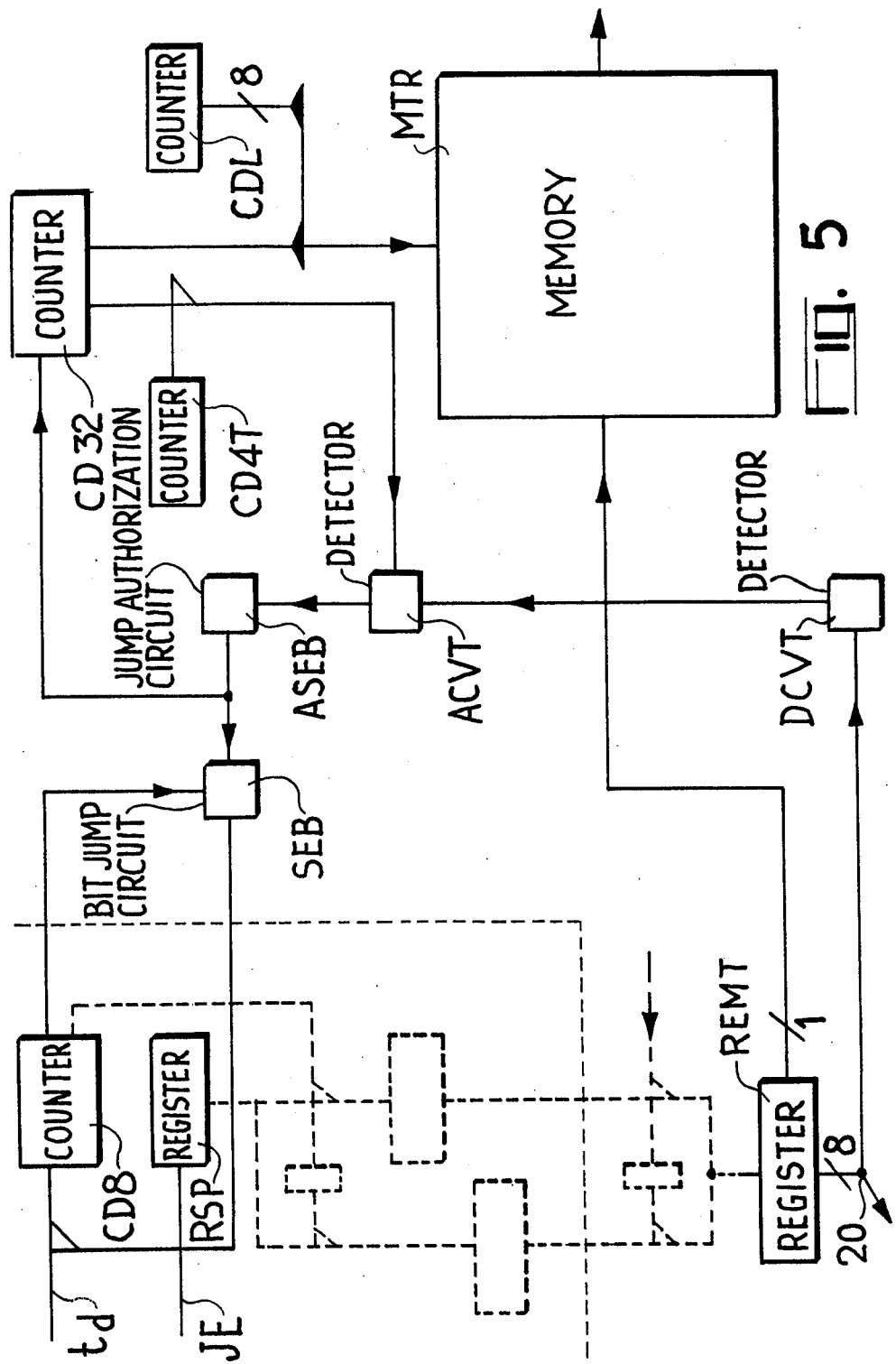
Figure 6:
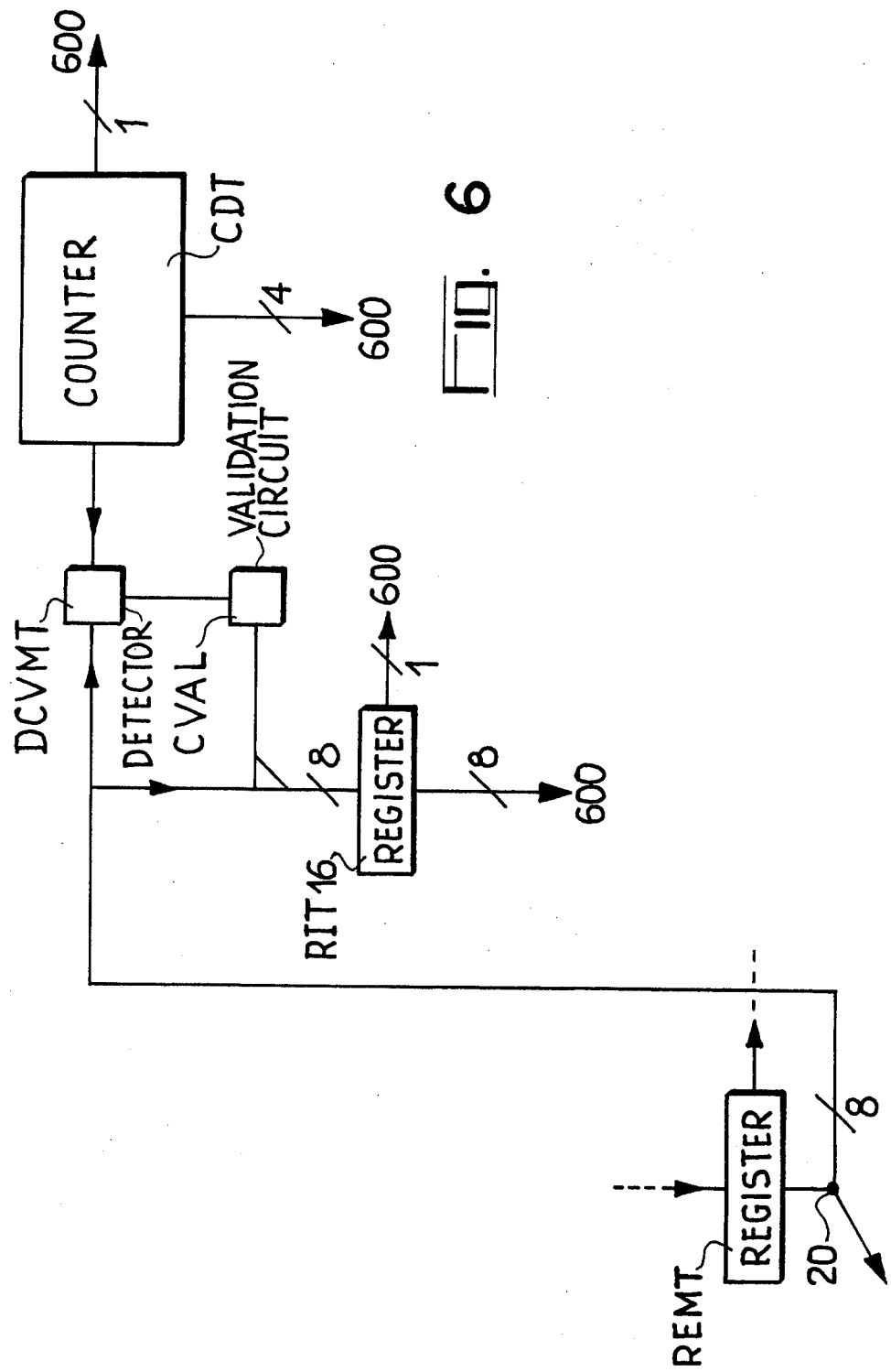

FIGS. 2, 5 and 6 diagrammatically illustrate different parts of an arrangement for applying the method according to the invention to the system illustrated in FIG. 1.

Figure 3:
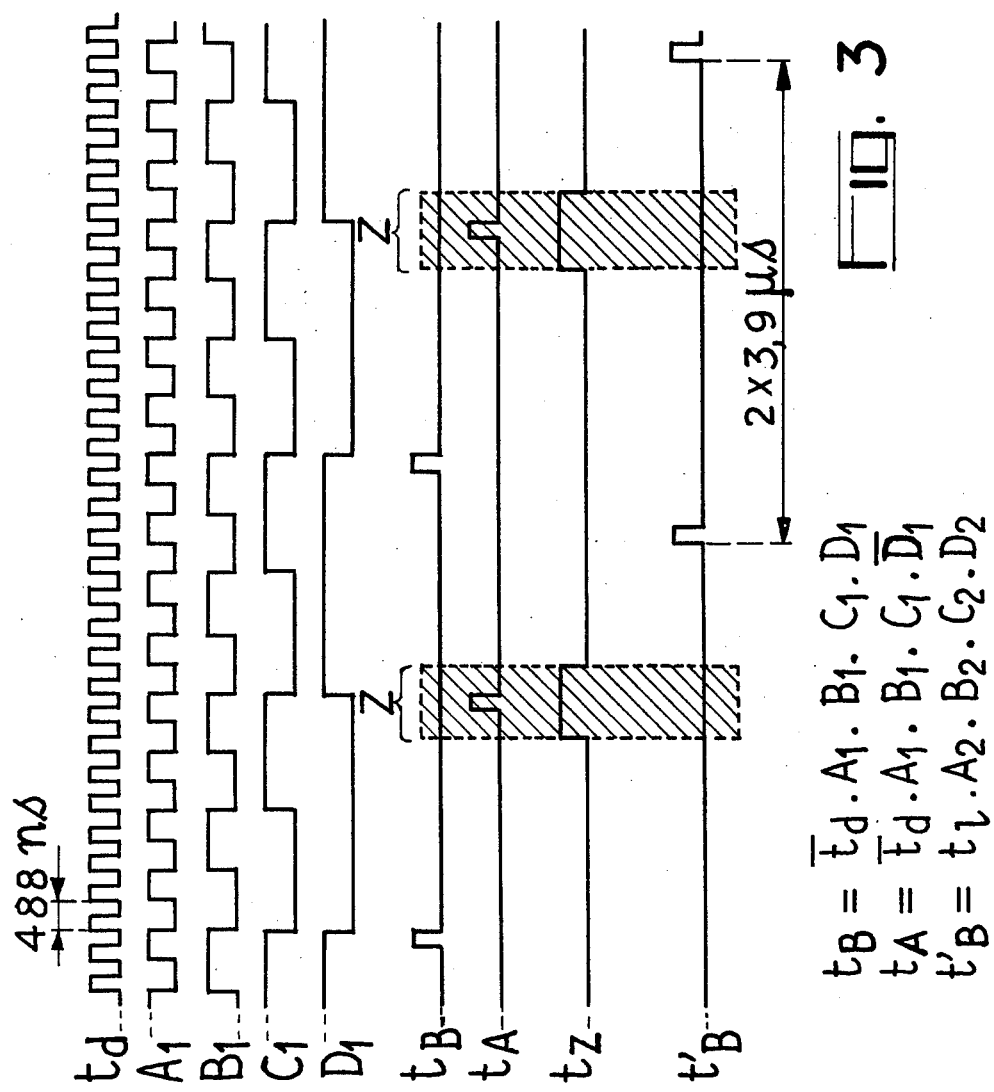

FIGS. 3 and 4 are explanatory diagrams.

FIG. 1 shows by way of example the content of the trains and frames of a PCM junction for "channel-by-channel" signalling. The 32 T.I.'s forming each frame are numbered 0 to 31. The T.I. 0 and the T.I. 16 carry particular messages which will be described hereinafter. The other T.I.'s, for example the T.I. 3, carry 8 bits denoted S, A, B, C, X, Y, Z, T, forming a sample of information belonging to the telephone channel V3. The allocations of the T.I.'s are in fact as follows:

T.I.'s 1 to 15: channels 1 to 15
T.I.'s 17 to 31: channels 16 to 30

Each bit comprises at least one pulse with a duration of at most 244 nanoseconds, the recurrence period amounting to 488 ns and, hence, the recurrence frequency of the bits (FREB, FIG. 1) being 2048 kHz, which is occasionally referred to in abbreviated form as the "2 MHz frequency".

A multiframe (not shown) is made up of 16 frames numbered for example from 0 to 15.

The T.I. 0 of the "even" frames (0, 2, . . . 14) contains a frame locking code word (CVT) whose use is known per se and whose existence is utilised by the invention.

The T.I. 0 of the odd frames (1, 3 . . . 15) contains words relating to alarm signals whose use is beyond the scope of the invention.

The T.I.'s 16 of the frames 0 contain a multiframe locking word and an alarm signal of which the use is beyond the scope of the invention.

The T.I.'s 16 of the other frames each contain two successive signalling words (in the case of so-called "channel-by-channel" signalling), words of 4 bits allocated as shown in the following Table:

| Number of the frame containing T.I. 16 | Number of the channels affected by | |
|---|---|---|
| | the first word | the second word |
| Frame 1 | V 1 | V 16 |
| Frame 2 | V 2 | V 17 |
| ...... | ... | ... |
| Frame 15 | V 15 | V 30 |

Example of performance of operations (a), (b), (c) and (d) (FIGS. 2, 3 and 4)

In the arrangement illustrated in FIG. 2, the elements functioning at the frequency of the local clock can be distinguished from the elements functioning at the frequency of the remote clock. The elements functioning at the frequency of the remote clock are confined to the top left-hand corner of the plan shown in FIG. 2 in the area defined by the broken line $H_D/H_L$.

The important elements of the part functioning at the frequency of the remote clock are described hereinafter with their principal connections:

an 8 bit register RSP of the "series — parallel" type which, at a "series" input, receives the information coming from an incoming junction JE and which is capable of relaying the information in parallel through 8 wires alternately along two recording channels VEA and VEB. The two channels respectively load the 8 bit registers RPA and RPB of the "parallel-parallel" type at times determined by other elements which will be described hereinafter;

a counter CD8 which formulates a signal when it decodes a pulse of a certain order of each T.I. This counter controls an inverter $I_1$ which is capable of alternately connecting the registers RPA and RPB to the channels VEA and VEB, respectively.

The important elements of the part functioning at the frequency of the local clock are described hereinafter together with their mutual connections:

a "parallel-series" register REMT which receives the information coming from RPA or from RPB via groups of wires VSA or VSB according to the orders received from elements described hereinafter. This register feeds its information in series to a frame memory MTR on the one hand and, on the other hand, in parallel to an output 20 whose function will be described hereinafter;

a counter CD8 identical with the above-mentioned counter having the same reference;

a detection circuit DET with two inputs connected to the outputs of the counters CD8. It detects the risk of error as explained hereinafter;

a correction circuit COR connected to the circuit DET;

a T.I. counter CD32 with an input connected to the circuit COR and two outputs. A first output is connected to a bistable circuit CD64 which detects the even and odd frames, and also to an inverter $I_2$ capable of alternately switching the channels VSA and VSB to the register REMT. This connection is placed under the control of the elements COR and CD8 (local clock) which have already been mentioned. A second output connected to the memory MTR is only used when all the synchronising operations have been carried out.

The mode of operation may be summarised as follows:

operation (a) under the control of DET;
operation (b) under the control of RPA and RPB alternately in dependence upon the state of CD8;
operation (c) under the control of CD32;
operation (d) by means of the register REMT and the inverter $I_2$ under the control of COR and CD32. This latter element delivers to the memory MTR the writing addresses of the word contained in the register REMT.

The curves shown in FIGS. 3 and 4 enable detection of the error risk and the mechanism behind operation (d) to be better understood.

FIG. 3 shows the oscillogram $t_d$ of the pulses of the remote clock and then curves illustrating the function of various logic elements on the time scale of $t_d$.

Curves $A_1$, $B_1$, $C_1$ illustrate the succession of logic states of the three stages of a counter contained in CD8 (remote clock).

Curve $D_1$ illustrates the succession of logic states of a bistable circuit (not shown) giving the reading order of the register RPA and the register RPB, this bistable circuit being controlled by the counter CD8 (remote clock).

Curve $t_B$ represents the loading times of the register RPB ($t_B = \overline{T}_d \cdot A_1 \cdot B_1 \cdot C_1 \cdot D_1$).

Curve $t_A$ illustrates the loading times of the register RPA ($t_A = \overline{T}_d \cdot A_1 \cdot B_1 \cdot C_1 \cdot D_1$). On either side of the time $t_A$ there is a zone Z where there is a risk of error. This zone is indicated by a hatched rectangle and is materialised by the state of a bistable circuit contained in the circuit DET.

This bistable circuit $t_z$ passes into state 1 at $A_1 \overline{B}_1 C_1 \overline{D}_1$ ("remote" time) passes into state 0 at $A_2 B_2 C_2 D_2$ (local time $t_1$)

The transfer time of the register RPA to the register REMT is the time $t_o$ conditioned by the three-stage counter and by the bistable circuit of the counter CD8 (local clock).

The product of the error risk $t_z$ by the time: $t'_B = \overline{t}_1 \cdot A_2 \cdot B_2 \cdot C_2 \cdot D_2$ is calculated and the result is recorded in a bistable circuit contained in the circuit COR. There are therefore two possibilities:

if this bistable circuit is in the state "0", the product recorded is "0", which means that the transfer time of RPA to REMT is outside the zone Z: no correction;

if this bistable circuit is in the state "1", the product recorded is "1", which means that the transfer time of RPA is REMT is within the zone Z; accordingly, there is a correction to be made and the circuit COR gives the corresponding order.

FIG. 4 shows how the correction is made by means of three diagrams (l), (m), (n).

In these three diagrams, there are three lines of crenels RPA, RPB and REMT on an identical time scale, each crenel corresponding to the time interval between two loadings of the corresponding register. This time interval amounts to 2 T.I.'s in the case of RPA and RPB and to 1 T.I. in the case of REMT. In addition, there is a perfectly stable overlap between the crenels of RPA and RPB, both controlled by the remote clock by conventional means (not shown).

The boundaries $f_1$ and $f_2$ of the error risk zone have been shown. This zone is used to prevent a register (RPA or RPB) from being read when the register is running so that a reading error could be produced.

FIG. 3 illustrates three cases:

at 3 (l), the case where perfect synchronism exists between the clocks;
at 3 (m), the case of local advance (local clock faster);
at 3 (n), the opposite case (local delay).

The arrows 31, 32 etc ... correspond to alternate readings of RPA and RPB of which the results are entered in the register REMT.

In the case of synchronism, the arrows 31, 32, 33, 34, etc. ... are always positioned in the same way relative to the boundaries $f_1$ and $f_2$.

In the case of local advance, it can be seen that the even arrows gradually come closer to the boundary $f_2$ until they coincide with it. In the event of coincidence, reading of the register which is in the process of being read, for example the register RPB (arrow 35), is repeated by means of the elements previously described. There is no loss of information because the arrows 33 and 36 correspond to two consecutive loadings of RPA.

In the case of local delay, the mode of operation is the same except that it is the boundary $f_1$ of the window F which initiates repetition of the reading of the same register. There is a loss of information (cf. arrows 33 and 36 in this case).

Example of performance of operations (e), (f) and (g) (FIG. 5)

The arrangement shown in FIG. 5 comprises elements already shown in FIG. 2, notably (in solid lines):
 the counter CD8 controlled by the remote clock;
 the register RSP;
 the register REMT;
 the counter CD32;
 the memory MTR.

The counter CD8 controlled by the local clock has not been shown again. However, it should be pointed out that this counter associated with CD32 at the input of the memory MTR defines the writing addresses of this memory.

In addition to the elements already described, the actual operations (e), (f) and (g) bring into service following specific elements:
 a frame counter CD4T which formulates a signal every four frames;
 a frame unlocking code detector DCVT receiving at one input the information coming from the output 20 of the REMT;
 a detector for detecting any loss of the frame locking code ACVT which receives the bits of the code detected by DCVT and formulates a specific signal in the event of loss of the frame locking code at an instant determined by CD32 associated with CD4T;
 a binary element jump authorisation circuit ASEB which comes into operation on reception of the signal formulated by ACVT in the event of loss of the code word;
 a bit jump circuit SEB connected to the clock input ($t_d$) of CD8 (remote clock);
 a reading counter CDL associated with the memory MTR and functioning at a time fixed by the local processing centre.

The mode of operation may be summarised as follows:
 operation (e) under the control of CD8 and CD32 and MTR;
 operation (f) under the control of DCVT and ACVT with intervention by CD4T and CD32;
 operation (g) under the control of ASEB, SEB, RSP, REMT.

It will be recalled that only the T.I. 0 of the even frames contains the frame locking code. The T.I. 0 of the odd frames does not contain this code. When the loss of this code has been detected, the jump authorisation is given as indicated above and execution of the jump is synchronised by CD8 with the time of the remote clock.

Execution of the binary element jump comprises deleting an elementary time $t_d$ at the input of the counter CD8 so that the commands which it generates are retarded by an elementary time, in particular the respective loadings in RPA and RPB.

The loss of the frame locking code is detected in several frames because the correcting operation (d) and the bit jump operation (g) are independent. The correcting operation (d) takes place at any time, even if the bit jump operation (g) is in progress.

In cases where the local clock is slower than the remote clock, a certain loss of information has to be accepted. In fact, the arrangement is such that no useful information is lost, this result being achieved by deciding to jump one T.I. 0, that of the odd frames. When 32 T.I.'s 0 have been jumped, it is one complete frame which jumps. The number of frame jumps is thus extremely limited provided, however, that the difference between the clocks is not too great.

Example of performance of the operations (h), (i), (j) and (k).

In the case of channel-by-channel signalling, the frames have to be synchronised in such a way that the signals contained in the T.I.'s 16 are allocated to the corresponding channels. Use is made of the fact that the T.I. 16 of the frame 0 contains one multiframe locking word.

The arrangement illustrated in FIG. 5 contains elements already shown in FIG. 2, notably the register REMT.

In addition to the elements already described, the operations (h), (i), (j) and (k) bring into service the following specific elements:
 a multiframe locking word (or "code") detector DCVMT connected to the register REMT and placed under the control of a frame counter CDT mentioned earlier on;
 a validation circuit for the T.I. 16, CVAL, which controls charging of the T.I. 16 in a register described earlier on under the control of DCVMT;
 a register RIT 16 with parallel inputs (8 wires) receiving the T.I.'s 16 of the register REMT at the time determined by the circuit CVAL and having two outputs towards the local processing centre (arrows 600);
 a frame counter CDT delivering to DCVMT and having two outputs which can be utilised by the local processing centre (arrows 600).

The mode of operation may be summarised as follows:
 operation (h) under the control of the detector DCVMT;
 operation (i) under the control of the counter CDT;
 operation (j) under the control of the circuit CVAL;
 operation (k) under the control of the register RIT 16.

On completion of the operation (k), the frame memory receives the T.I. 16 of which the frame counter indicates the frame to which it belongs.

The logic circuits of the arrangement for applying the method according to the invention may be produced on the basis of semiconductors of the C-MOS-type (complementary metal oxide semiconductor).

The invention applies to PCM systems comprising a number of bits per T.I. different from 8 and a number of channels per frame different from 32. It is known that, in the case of numbers which are not powers of two, any combination of bits can be detected by using registers of the coupled type i.e. comprising reaction loops between stages.

What we claim is:

1. In a PCM switching network wherein time intervals comprise $n$ bits, a junction synchronization system in a local switching center equipped with a local clock connected with a distant switching center equipped with a distant clock, comprising:
   means for comparing said local and said distant clock signals;
   means for detecting the risk of error which occurs when a n-bit register loaded at the frequency of the distant clock is read at the frequency of said local clock;
   means for successively recording at the frequency of said distant clock the pulse trains relating to the successive channels of one and the same frame alternately in a register A and in a register B;
   means for counting the time intervals at the frequency of said local clock and determining the time of correction;
   means for carrying out said correction by repeating the reading of one of the two registers A and B at the frequency of said local clock;
   means for recording the time intervals in a frame memory;
   means for detecting the loss of a frame locking code; and
   means for shifting the pulse trains recorded in said registers A and B in successive jumps of one bit until said frame locking code is detected.

2. A system as claimed in claim 1 further comprising:
   means for detecting a multiframe locking signal;
   means for counting the frames;
   means for detecting the first frame of a multiframe; and
   means for recording the time intervals containing signalling data at the time of the detection of the first frame.

3. In a PCM-connection between a local center and a distant center equipped respectively with a local clock and a distant clock, a method for synchronizing in the local center one n-channel digital group comprising:
   performing a synchronizing operation on entry into the local center, loading alternately the incoming information into two registers A and B at the frequency of the distant clock and alternately removing the incoming information from the two registers at the frequency of the local clock;
   receiving the information coming from the registers A and B in a parallel-series register and feeding the information from the parallel-series register in series to a frame memory at the frequency of the local clock;
   repeating the reading of the register which is in the process of being read when the local clock is quicker and repeating the reading of the other register when the local clock is slower;
   shifting the incoming information by one bit as many times as is necessary to synchronize the time intervals of the PCM connection.

* * * * *